July 10, 1928.  
F. A. BENFORD  
REFLECTOMETER  
Filed April 30, 1925

1,677,014

Inventor:  
Frank A. Benford,  
by *Alexander F. [illegible]*  
His Attorney.

Patented July 10, 1928.

1,677,014

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

REFLECTOMETER.

Application filed April 30, 1925. Serial No. 27,015.

My invention relates to devices for measuring the amount of light reflected by a surface. These devices are usually known as reflectometers. One well known form of device for this purpose employs two parallel surfaces between which an area is bounded by a specular ring. In this form of device one of the surfaces on one side of the ring serves as the illuminating surface while the surface on the opposite side of the ring is the illuminated surface, the coefficient of which is measured. Through the medium of a photometer a small region of the illuminating surface is compared with a small region of the illuminated surface. This type of device of a prior art, however, has the objection that they are not accurate by anywhere from 10 to 50%, depending upon whether the measurement is to be taken in connection with a light diffusing surface or in connection with a specular surface. Among the causes of inaccuracy in such devices are, for example, the use of a specular surface as the bounding surface as above mentioned, which is located between the two planes, also the large extent of the bounding surface. Another cause is that the angle of observation is not the best angle for obtaining an average reading.

Among the objects of my invention are to provide a reflector which is free from the above objections, in which the illuminating and illuminated surfaces are located at a dihedral angle with respect to each other. It is also an object of my invention to interpose secondary surfaces between the illuminating and illuminated surfaces, and in connection with which secondary surfaces the observations or readings are taken rather than from the illuminating and illuminated surfaces direct. Therefore, this application is in the form of a modification of my Patent No. 1,600,865, September 21, 1926. It is also an object of my invention to so locate the secondary surface as to insure the best angle of observation.

Figure 1:
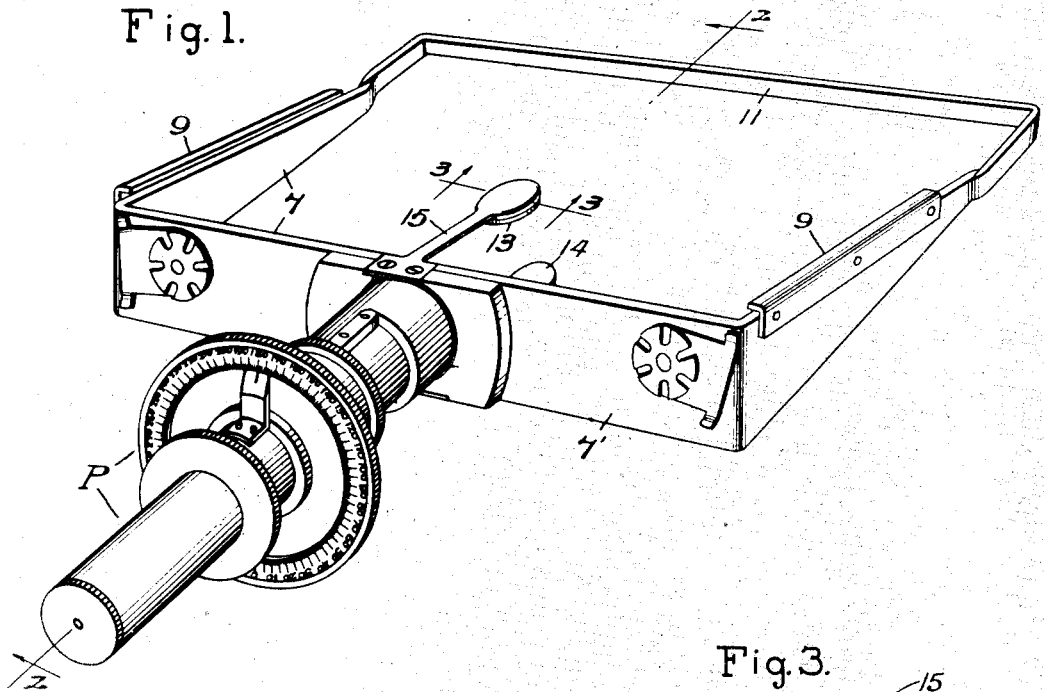
Figure 3:
Figure 2:
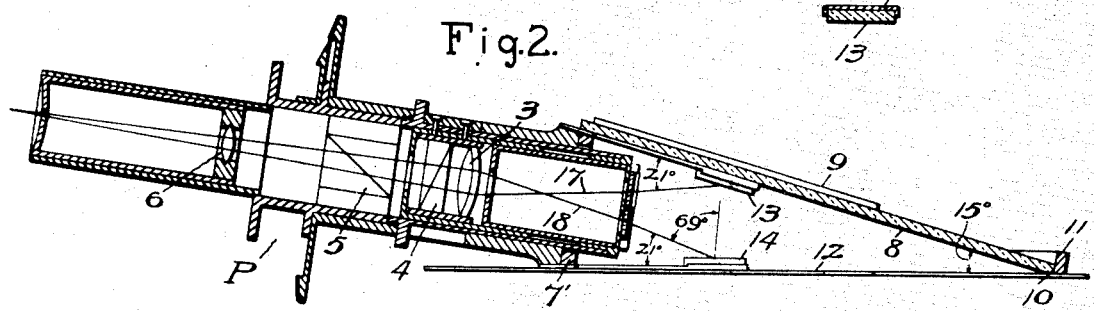
Figure 5:
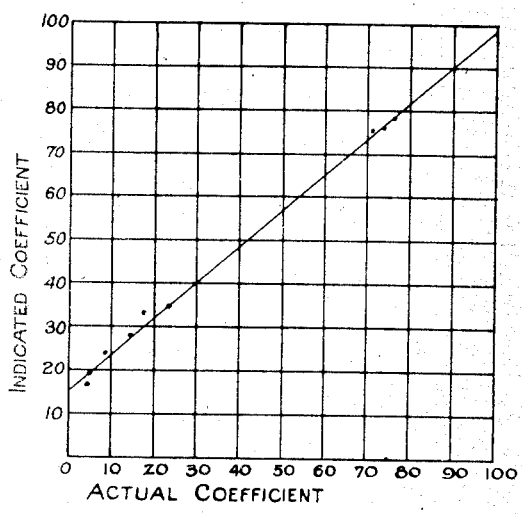
Figure 4:
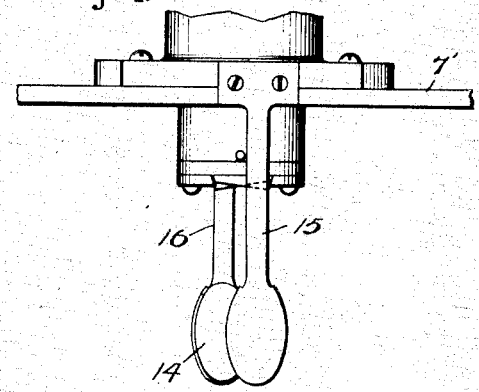

The means for accomplishing the foregoing are hereinafter more fully set forth and claimed, reference being had to the accompanying drawing, in which Fig. 1 shows in perspective the photometer attached to the bounding surface or frame, which frame is located between the primary surfaces, namely the illuminating and illuminated surfaces. In this figure the secondary or target surfaces are also shown mounted upon suitable supports which are secured to the frame in proximity of the end of the photometer. Fig. 2 shows the device in section along the axis 2—2 of Fig. 1. Fig. 3 is a section taken along the axis 3—3 of Fig. 1, of one of the secondary or target surfaces and of the supporting element. Fig. 4 is an enlarged top view of the target surfaces and of the mounting elements. Fig. 5 is a calibration curve showing the relation of the readings on a number of specimen surfaces made with the device of my invention as compared with the actual coefficients of such surfaces. The ordinates are the readings on the instrument, while the abscissæ represent the actual coefficient scale ranges from 0 to 100, 0 representing the coefficient of reflection of a black surface and 100 the coefficient of reflection of a perfectly white surface.

In the prior devices as previously pointed out a small section of each of the illuminating and illuminated surfaces are directly compared. Obviously the two small areas are viewed from some particular angle. It is a fact, of course, that the reflected light from the illuminated surface varies with the angle. This is true of all illuminated surfaces. Obviously, therefore, to measure the reflected light the light should be collected from all angles rather than from a particular angle as heretofore. In the device of my invention this is accomplished by the provision of a pair of secondary surfaces which are called the target surfaces. One of these surfaces is placed facing the illuminating primary surface, while the other target surface is placed facing the illuminated test surface. With this arrangement each target is therefore illuminated by the whole primary surface which it faces. Therefore, the target surface collects light from the primary surface from a great many angles thus approximating the ideal condition above mentioned. In the drawing the targets in question are clearly shown in their operative positions in Figs. 1, 2 and 4.

Referring more in detail to the drawing the photometer P is of a standard type and is provided with a projector lens 3, a polarizer 4, an analyzer 5 and an eye-piece 6. This photometer is secured to the frame 7, Fig. 1 in any suitable manner. The forward end of this photometer projects through the side piece 7' of the frame. The frame is further arranged to receive a translucent plate 8 on the top side. For this purpose guides 9 are provided, which latter are secured to the sides of the frame. When in position the forward edge 10 of the plate rests against the inner surface of the side 11 of the frame. This translucent plate serves as the source of illumination for the surface to be tested.

Prior to my invention in the process of testing, a small section of the illuminating surface of the plate 8 and a small section of the illuminated surface are brought simultaneously within the range of the photometer P for comparison. With the present invention the primary surfaces are not directly compared. Instead I provide a pair of target secondary surfaces 13 and 14 which are mounted respectively on suitable supports such as the members 15 and 16. These supports 15 and 16 are in turn secured in any suitable manner to the frame 7. The target elements 13 and 14 may be made of a white diffusing surface such as white marble or white porcelain. With the arrangement shown in the drawing it will be seen that the lower surface of the target 13 is illuminated by the whole surface 12. Similarly, the target surface 14 is illuminated by the whole surface 8. Both of the target surfaces 13 and 14 are located so that they fall within the field of the photometer P. By means of the photometer the illumination of the target surfaces 13 and 14 are compared in the usual manner and this gives a reading on the reflection of the surface 12. This reading is then referred to the calibration curve for the actual coefficient.

It will be understood that in order that the instrument read as near perfect as possible, all of the surfaces, such as the surfaces of the frame 7, should be reduced to a minimum. For this reason the sides of the frame are made sloping as indicated in Fig. 1. Furthermore, the inner surface of the frame are made of a white diffusing character, for example, as by painting with white enamel. It can be readily demonstrated that if a plain surface, such as the surface 12, be illuminated by a parallel surface of infinite extent illumination of the plain surface will be equal in brightness to that of the illuminating surface. However, a plane of infinite extent is not to be obtained in practice and it is, therefore, necessary to resort to some practical device which will approximate the same result. This result is approximated by sloping the primary surfaces 8 and 12 toward each other as indicated. In practice the plate 8 may be of transparent porcelain. When light is thrown upon the plate 8 from the outside it serves as a light diffusing element for illuminating the surface 12. These surfaces, as already explained, serve to illuminate the target surfaces 13 and 14, which target surfaces fall within the photometric field of the instrument. By rotating the Nicol prism 5 contained in the optical tube a photometric balance may be obtained between the surfaces 13 and 14. The amount of rotation of the prism will, of course, give a reading proportional to the coefficient of reflection as is well known. It will be observed by referring to Fig. 4 that the target surfaces 13 and 14 are displaced with respect to the central vertical axis of the instrument. As shown in Fig. 4, the support 15 is shifted to the right, while the support 16 is shifted to the left of the central plane. The object of this displacement is to reduce to a minimum the interfering effect that each of the target surfaces 13 and 14 may have upon each other.

A number of heterogeneous surfaces were each tested for coefficient of reflection with the device of my invention. The result obtained is indicated in Fig. 5. In this figure the zero point along the lower axis indicates the coefficient of reflection of a black surface, whereas the point marked 100 indicates the coefficient of reflection of a perfectly white surface. The vertical column indicates the readings as obtained with the device of my invention. It will be seen that the curve plotted through these points is in the form of a straight line. The advantage of this characteristic is that it enables the instrument to be easily recalibrated. I find that this straight line characteristic depends upon the position of the target surfaces 13 and 14 within the dihedral angle. I find that if the primary surfaces are inclined at about an angle of 15° and the target surfaces brought near to the photometer so that the lines 17 and 18 which represent the centers of the photometric fields make angles of 21° respectively with the primary surfaces 8 and 12 that the straight line characteristic is insured. Otherwise, the curve will deviate from a straight line. Such a deviation, however, does not affect the invention, inasmuch as the principles of variation are the same provided the target surfaces 13 and 14 are used. Obviously, therefore, the angles 15 and 21 mentioned may be varied.

While I have shown and described my invention in connection with a device of particular construction, it will be understood that, in view of the disclosure, variations may be made without departing from the spirit of the invention or from the scope of the claims herein contained.

What I claim as new and desire to secure by Letters Patent of the United States, is:—

1. A photometric device comprising a photometer, a diffusing surface adapted to be illuminated to serve as a standard of comparison for measuring the index of reflection of a desired surface, said device so constructed that the diffusing surface and any surface, the index of reflection of which is desired, may be brought together, a pair of auxiliary diffusing surfaces located within the field of said photometer, one of said auxiliary surfaces facing toward the standard surface and adapted to be directly illuminated thereby and the other auxiliary surface facing toward the region where the surface to be tested and the device are brought together, said other auxiliary surface adapted to be illuminated by the surface to be tested when said surface and the device are brought together and when said surface to be tested is illuminated by the diffusing standard surface, whereby the index of reflection of the surface to be tested may be determined by comparing the illumination of the auxiliary surfaces.

2. A device for measuring the amount of light reflected from a surface, said device comprising a photometer, an illuminating element for the surface and a pair of auxiliary diffusing surfaces facing in opposite directions, one for receiving light directly from the illuminating element and the other for receiving light directly from the illuminated surface, said auxiliary surfaces located within the field of the photometer.

3. A photometric device comprising a photometer, a frame with a translucent light diffusing element on one side thereof, an opening on a different side of the frame arranged to be covered by a reflecting surface, a pair of auxiliary light diffusing surfaces mounted within the frame, said surfaces having the same coefficient of reflection, one of said auxiliary surfaces facing the light diffusing element and the other auxiliary surface facing the said reflecting surface, both auxiliary surfaces being located within the field of the photometer whereby when light is thrown upon the translucent element said reflecting surface and one of said auxiliary surfaces are both lighted by the light diffusing element, and whereby the other auxiliary surface is lighted by the reflecting surface whereby the coefficient of reflection of said reflecting surface may be determined by comparing the illumination of the two auxiliary surfaces.

4. A photometric device comprising a photometer, a pair of auxiliary light diffusing reflecting surfaces, both having the same coefficient of reflection, and both located within the field of said photometer, one of said auxiliary surfaces facing in one direction and the other in a different direction whereby the device may be brought into proximity of a reflecting surface with one of said auxiliary surfaces facing toward the reflecting surface, said device comprising also a translucent light diffusing element facing also said reflecting surface whereby when light is thrown upon the translucent element both the reflecting surface and one of the auxiliary surfaces are lighted by the translucent element, and whereby the other auxiliary surface is lighted in turn by the said reflecting surface, said device comprising also an enclosure between the translucent diffusing element and the reflecting surface for excluding all other light from the said auxiliary surfaces and from the reflecting surface except that furnished through the medium of the translucent element whereby the coefficient of reflection of the reflecting surface may be determined by comparing the illumination of the two auxiliary surfaces.

5. The process of determining the coefficient of reflection of a reflecting surface which consists in subjecting the said surface to be illuminated exclusively by an illuminated light diffusing element, subjecting an auxiliary diffusing surface to be illuminated by the diffusing element exclusively, and subjecting a second auxiliary diffusing surface having the same coefficient of reflection as the first auxiliary surface to be illuminated by the said reflecting surface and comparing the illumination of said auxiliary surfaces.

6. A device for measuring the amount of light reflected from a surface, said device comprising a photometer, a light diffusing surface element adapted to be illuminated to serve as a standard of comparison and for illuminating said reflecting surface, and a pair of auxiliary light diffusing surfaces located within the field of the photometer and in position such that one of the auxiliary diffusing surfaces is illuminated directly by the illuminating element and not by the reflecting surface, while the other auxiliary surface is illuminated directly by the reflecting surface and not by the illuminating surface.

7. In a photometric device, an illuminating light diffusing surface serving as a standard of comparison, a photometer, a pair of light diffusing auxiliary surfaces located within the field of the photometer and so placed that one of the diffusing auxiliary surfaces faces the standard surface and is directly illuminated thereby and the other diffusing surface faces away from the standard surface and is illuminated by a secondary surface illuminated in turn by the standard surface whereby the reflecting power of the secondary surface may be compared with that of the illuminating surface by comparing the illumination of the said auxiliary surfaces.

8. A device for measuring the amount of light reflected from a surface, said device comprising a photometer, a light diffusing surface element adapted to be illuminated to serve as a standard of comparison and for illuminating said reflecting surface, and a pair of auxiliary light diffusing white enameled surfaces located within the field of the photometer and in position such that one of the auxiliary diffusing white enameled surfaces is illuminated directly by the illuminating element and not by the reflecting surface, while the other auxiliary diffusing white enameled surface is illuminated directly by the reflecting surface and not by the illuminating surface.

In witness whereof, I have hereunto set my hand this 28th day of April, 1925.

FRANK A. BENFORD.